United States Patent
Mattsson et al.

(10) Patent No.: US 10,694,545 B2
(45) Date of Patent: Jun. 23, 2020

(54) COMMUNICATION DEVICE

(71) Applicant: Telefonaktiebolaget LM Ericsson (publ), Stockholm (SE)

(72) Inventors: Johan Mattsson, Sundbyberg (SE); Håkan Andersson, Linköping (SE); Ashim Biswas, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 74 days.

(21) Appl. No.: 15/773,736

(22) PCT Filed: Nov. 6, 2015

(86) PCT No.: PCT/EP2015/075902
§ 371 (c)(1),
(2) Date: May 4, 2018

(87) PCT Pub. No.: WO2017/076460
PCT Pub. Date: May 11, 2017

(65) Prior Publication Data
US 2018/0324860 A1  Nov. 8, 2018

(51) Int. Cl.
*H04W 74/08* (2009.01)
*H04B 17/318* (2015.01)
*H04W 16/14* (2009.01)
*H04W 72/04* (2009.01)
*H04W 72/12* (2009.01)

(52) U.S. Cl.
CPC ...... *H04W 74/0816* (2013.01); *H04B 17/318* (2015.01); *H04W 16/14* (2013.01); *H04W 72/0453* (2013.01); *H04W 72/12* (2013.01)

(58) Field of Classification Search
CPC ............... H04B 17/318; H04W 16/14; H04W 72/0453; H04W 72/12; H04W 74/0816
See application file for complete search history.

(56) References Cited

U.S. PATENT DOCUMENTS

| | | | |
|---|---|---|---|
| 6,473,414 B1 | 10/2002 | Hartley et al. | |
| 9,961,558 B2 * | 5/2018 | Chen | H04W 16/14 |
| 10,009,892 B2 * | 6/2018 | Cheng | H04W 72/0446 |
| 10,219,159 B2 * | 2/2019 | Baek | H04W 16/14 |
| 10,349,293 B2 * | 7/2019 | Yerramalli | H04W 72/14 |
| 10,375,592 B2 * | 8/2019 | Martin | H04W 24/10 |
| 10,405,350 B2 * | 9/2019 | Gou | H04W 24/02 |
| 2010/0091789 A1 | 4/2010 | Choi et al. | |
| 2011/0075586 A1 | 3/2011 | Hu et al. | |
| 2012/0230205 A1 | 9/2012 | An et al. | |

(Continued)

OTHER PUBLICATIONS

European Telecommunications Standards Institute, "Broadband Radio Access Networks (BRAN); 5 GHz high performance RLAN; Harmonized EN covering the essential requirements of article 3.2 of the R&TTE Directive", Harmonized European Standard, Draft ETSI EN 301 893 V1.7.2, Jul. 1, 2014, pp. 1-95, ETSI, France.

*Primary Examiner* — Ahmed Elallam
(74) *Attorney, Agent, or Firm* — Sage Patent Group (57) ABSTRACT

Method for transmitting signals on a transmission channel (103), comprising the steps of detecting (S101) a channel occupancy of a transmission channel (103) by processing data from a receiving path (105) after an activation of a transmission path (111); and deactivating (S102) the transmission path (111) on the basis of the detected channel occupancy.

17 Claims, 8 Drawing Sheets

(56) References Cited

U.S. PATENT DOCUMENTS

| | | | |
|---|---|---|---|
| 2015/0365931 A1* | 12/2015 | Ng | H04L 1/1812 |
| | | | 370/329 |
| 2016/0073366 A1* | 3/2016 | Ng | H04W 56/001 |
| | | | 370/329 |
| 2016/0095110 A1* | 3/2016 | Li | H04W 72/1215 |
| | | | 370/329 |
| 2016/0345345 A1* | 11/2016 | Malik | H04W 48/04 |
| 2017/0150382 A1* | 5/2017 | Martin | H04W 16/14 |
| 2017/0280341 A1* | 9/2017 | Nigam | H04W 24/10 |
| 2018/0035436 A1* | 2/2018 | Sharma | H04W 72/085 |
| 2018/0103458 A1* | 4/2018 | Tooher | H04W 16/14 |
| 2018/0220459 A1* | 8/2018 | Park | H04W 48/10 |
| 2018/0310332 A1* | 10/2018 | Ahn | H04W 28/26 |
| 2019/0014483 A1* | 1/2019 | Kwak | H04L 27/26 |

\* cited by examiner

COMMUNICATION DEVICE

TECHNICAL FIELD

The present invention relates to a communication device for transmitting signals on a transmission channel and a method for transmitting signals on a transmission channel.

BACKGROUND

An LTE-U deployment can use an unlicensed spectrum that is today generally used by Wi-Fi. Typically, LTE-U refers to a stand-alone version of Long-Term Evolution (LTE) operating in the unlicensed band. License-Assisted Access via LTE (LAA-LTE) is one of the main work items for the 3GPP LTE Release 13 standard being proposed as a technology for operation on both a licensed and an unlicensed spectrum.

In an LAA-LTE deployment, the User Equipment (UE) connects to an LTE network on a regular, licensed spectrum band, the so-called primary cell (P-cell). In addition, it can also connect to the same network on an unlicensed spectrum, i.e., the secondary cell (S-cell). There may be more than one S-cell, i.e., more than one carrier in the unlicensed band. The unlicensed carrier can be used to relieve the licensed carrier from data whenever it is available. In this way the licensed carrier can be used for robust control signaling and the unlicensed carrier can be used to boost user-data rates in a best-effort fashion.

One of the main goals of the 3GPP work item is to find a solution to handle coexistence with other access technologies, such as Wi-Fi, and also between several LAA-LTE systems.

Listen-Before-Talk (LBT) is a protocol by which the desired channel on the wireless medium is first sensed for any potentially interfering transmissions before a transmission begins. If the medium is found to be free, the transmitter can start using it. Together with a back-off mechanism an LBT-protocol potentially avoids collisions. See, for example, the Load-Based Equipment (LBE) protocol described in ETSI EN 301 893.

The LBT protocols usually comprise a number of steps that include the step of listening to the medium, e.g. by measuring the received signal with procedures such as Clear-Channel Assessment (CCA), the step of deciding if the medium is busy/free, e.g. based on energy detection and/or decoding of signal, and the step of starting the transmission, e.g. if medium is free, or after a defined back-off period, the system starts the transmission.

Although LBT is used there is a possibility that different transmitters start their transmissions at the same time causing a collision and interference to each other. The way an LTE-U system handles this collisions is implementation-dependent. One way to handle collisions is like the standard LTE system handles disturbances of transmissions, i.e., the receiver either does not respond or sends a negative acknowledgement.

When transmitting signals on a transmission channel a receiving path of a communication device is turned off when the transmitting path is turned on since otherwise the receiving path would receive the transmission of the transmitting path.

SUMMARY

It is an object of the present invention to reduce the negative effects of collisions on a transmission channel, like the duration of the interference caused by the collisions.

This object is solved by subject-matter according to the independent claims. Preferred embodiments are subject of the dependent claims, the description and the figures.

According to a first aspect this object is solved by a method for transmitting signals on a transmission channel, comprising the steps of detecting a channel occupancy of a transmission channel by processing data from a receiving path after an activation of a transmission path; and deactivating the transmission path on the basis of the detected channel occupancy. The method is for use in a communication device so that the method steps are typically performed by a communication device. The method has the technical advantage that relayed data from the receiving path are considered in deciding whether to use the transmission channel or not. Thereby, the effects of collisions on the transmission channel can be reduced.

In a preferred embodiment of the method the channel occupancy is detected on the basis of the received power on the transmission channel in a time window or a sequence of time windows. This embodiment has the technical advantage that channel occupancy can be detected reliably in one or several time windows in succession.

In a further preferred embodiment of the method the received power is evaluated on the basis of an average power or a peak power within the time window. This embodiment has the technical advantage that the channel occupancy can be detected with minimized probability of false positives or in a short time, respectively.

In a further preferred embodiment of the method the length of the time window is shorter than a delay in the receiving path. This embodiment has the technical advantage that the channel occupancy is detected in a fast manner. In this case several successive time windows can be used. Even if the first window does not trigger a detection, a later one might.

In a further preferred embodiment of the method the time window is adjustable. This embodiment has the technical advantage that the time window can be adapted, e.g., with respect to the duration of the time window. The total delay can be filled with successive, shorter time windows.

In a further preferred embodiment of the method a length of the time window is adjusted on the basis of the characteristics of the transmission channel. This embodiment has the technical advantage that that channel occupancy can be detected reliably.

In a further preferred embodiment of the method the activation of a transmission path comprises an activation of a power amplifier in the transmission path.

In a further preferred embodiment of the method the deactivation of a transmission path comprises a deactivation of a power amplifier in the transmission path.

In a further preferred embodiment of the method the transmission channel is a channel within an unlicensed band comprising a Wi-Fi channel, an LTE-U channel or an LAA-LTE channel or a channel within a licensed band comprising an LTE channel, an UMTS channel or a GSM channel. This embodiment has the technical advantage that suitable transmission channels are used.

In a further preferred embodiment of the method the data are processed within a predetermined time period after the activation of the transmission path.

According to a second aspect this object is solved by a communication device for transmitting signals on a transmission channel, wherein the communication device is adapted to detect a channel occupancy of the transmission channel by processing data from a receiving path after an activation of a transmission path; and deactivate the transmission path on the basis of the detected channel occupancy. The communication device has the same technical advantages as the method according to the first aspect.

An apparatus for a communication device comprising a processor and a memory is provided, said memory containing instructions executable by said processor whereby said apparatus is operative to detect a channel occupancy of the transmission channel by processing data from a receiving path after an activation of a transmission path; and deactivate the transmission path on the basis of the detected channel occupancy. The apparatus has the same technical advantages as the method according to the first aspect. The apparatus for the communication device can additionally be operative to perform others of the aforementioned embodiments of the method.

In a preferred embodiment of the communication device the communication device is adapted to detect the channel occupancy on the basis of the received power on the transmission channel in a time window or a sequence of time windows.

In a further preferred embodiment of the communication device the communication device is adapted to evaluate the received power on the basis of an average power or a peak power within the time window.

In a further preferred embodiment of the communication device the length of the time window is shorter than a delay in the receiving path.

In a further preferred embodiment of the communication device the communication device is adapted to adjust the time window.

In a further preferred embodiment of the communication device the communication device is adapted to adjust a length of the time window on the basis of the characteristics of the transmission channel.

In a further preferred embodiment of the communication device the activation of a transmission path comprises an activation of a power amplifier in the transmission path.

In a further preferred embodiment of the communication device the deactivation of a transmission path comprises a deactivation of a power amplifier in the transmission path.

In a further preferred embodiment of the communication device the communication device is user equipment, a base station or machine-type communication device. The user equipment can be a mobile phone, a pager or a tablet computer. The base station can be an Evolved Node B (eNB), a Node B or a base transceiver station (BTS). The machine-type communication device can be a sensor or a fieldbus device.

In a further preferred embodiment of the communication device the communication device is adapted to process the data within a predetermined time period after the activation of the transmission path.

The aforementioned embodiments of the communication device have the same technical advantages as the corresponding method steps.

According to a third aspect this object is solved by computer program product loadable into the memory of a communication device, comprising software code portions for performing the steps according to method according to the first aspect when said product is run on the communication device. The computer program product has the same technical advantages as the method according to the first aspect.

BRIEF DESCRIPTION OF THE DRAWINGS

Further embodiments may be described with respect to the following Figures, in which.

DETAILED DESCRIPTION OF EMBODIMENTS

Figure 1:
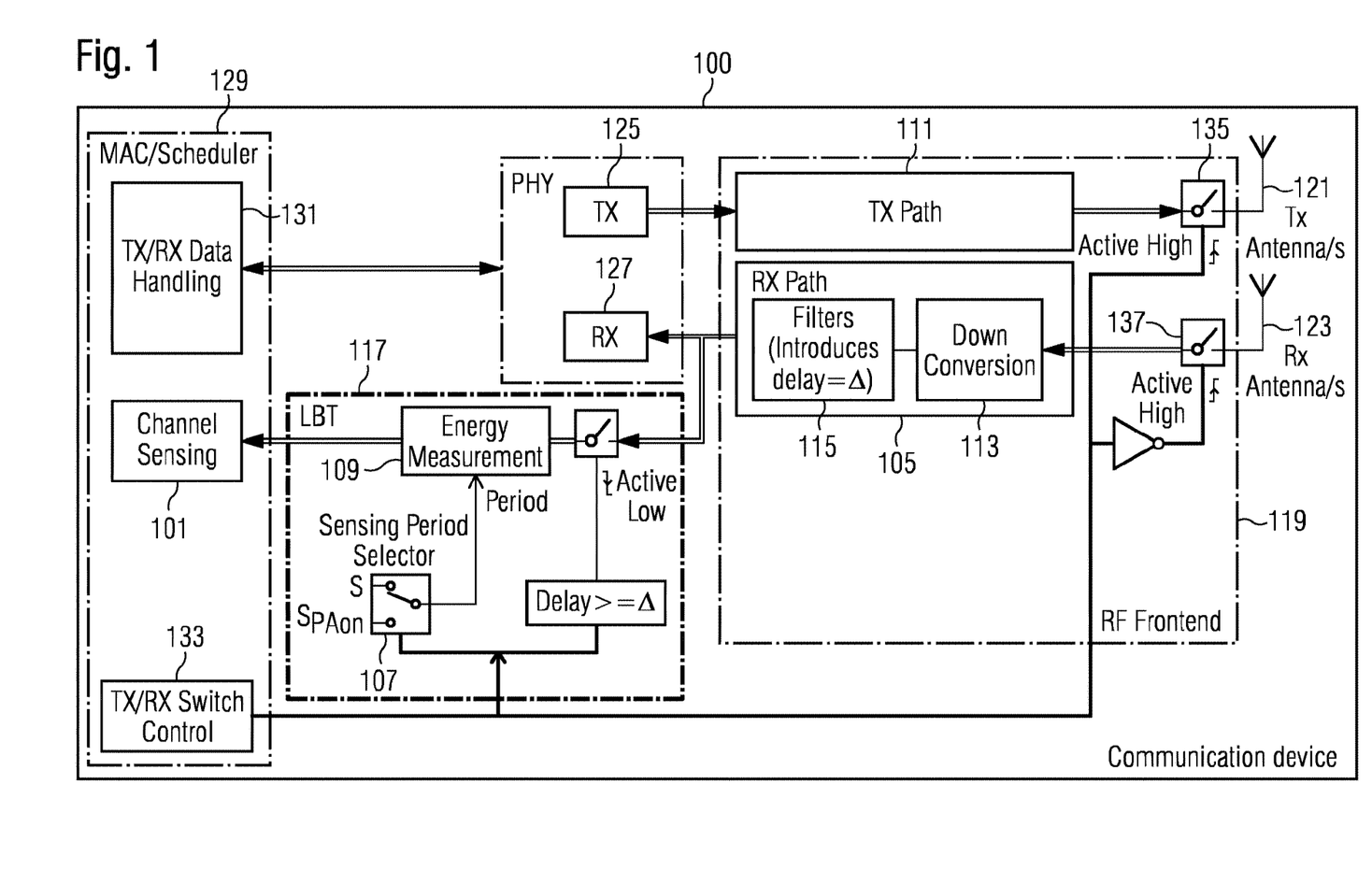
FIG. 1 shows a system diagram for collision reduction in a communication device.

FIG. 1 shows a communication device 100 in which a delay due to filtering in a receiving path (Rx path) 105 can be used to perform channel sensing even after a transmitting path (Tx path) 111 is activated. The receiving path 105 comprises a unit 113 for down-conversion of the received signal and a unit 115 for filtering the signals. These units 113 and 115 cause a processing delay of the signals in the receiving path 105.

The transmitting path 111 and receiving path 105 are part of a radio-frequency frontend 119 of the communication device 100. At the one side the transmitting path 111 and the receiving path 105 of the radio-frequency frontend 119 are coupled with a transmitting antenna 121 and a receiving antenna 123, respectively. At the other side the transmitting path 111 and the receiving path 105 of the radio-frequency frontend 119 are coupled with a transmitter 125 and a receiver 127, respectively. The transmitting path 111 comprises a switch 135 for deactivating or activating the transmitting path 111. The receiving path 105 comprises a switch 137 for deactivating or activating the receiving path 105.

In summary, there is an internal delay in the communication device 100 from the time when the measurement of the transmission channel is taken at the receiving antenna 123 to the time when the decision is made whether the transmission channel is free or not. The turnaround period depends on the implementation of the communication device 100 and on the digital domain. The turnaround period comprises the time it takes from receiving data at the receiving antenna 123, the time through the automatic gain control AGC and its processing time, the processing time of producing samples, and finally the time for performing energy detection on the samples. The turnaround period starts precisely when the communication device 100 has switched from receiving to transmitting until the last sample arrives at an energy measurement unit 109.

If some of the aforementioned steps in the turnaround period are skipped, problems may arise. For example, an evaluation of the energy detection not based on a series of samples but rather based on an instantaneous value close to the automatic gain control AGC may lead to erroneous detections, like false positives results, since the measurement period may be too short to accurately assess the energy content of the transmission channel.

During the turnaround period another transmitter on the transmission channel can start transmission. If the communication device 100 keeps using the transmission channel, a collision occurs, since the communication device 100 has its receiving path 105 turned off and its power amplifier in the transmitting path 111 turned on for transmission.

A MAC/Scheduler 129 has a unit 131 for Tx/Rx data handling, a channel sensing unit 101 for sensing the transmission channel, and a unit 133 for Tx/Rx switch control.

Due to the delay in the receiving path 105 of the communication device 100 the decision to switch on its power amplifier of the communication device 100 and to send signals on the transmission channel can lead to a collision with another transmitter on same transmission channel, which starts to transmit during this delay, even if the transmission channel has been detected beforehand as free.

Two different modes are visualized in the LBT logic box 117 that are implemented by a sensing period selector 107 for sensing period S and sensing period SPAon after the power amplifier is turned on.

In a first mode of LTE-U LBT the communication device 100 evaluates within the sensing period S successive Clear-Channel Assessment windows as time windows in order to determine when the power amplifier can be turned on. There are various algorithms that can make a decision when activation of the transmission channel is performed. Hence, the LTE-U detects that the transmission channel 103 is already occupied by another transmitter and will not start a transmission that ruins the already ongoing transmission. Thus, License-Assisted Access is well compatible with other technologies.

When the power amplifier is turned on immediately after a Clear-Channel Assessment CCA window is found to be free, i.e. the Listen-Before-Talk algorithm decides that the power amplifier can be turned on, there is a delay due to the turnaround period in the communication device 100, i.e. at the eNB or the user equipment depending on whether it is a downlink or an uplink that seeks to transmit.

The turnaround period causes that the CCA-window is evaluated at a later point of time than when it was actually received at the receiving antenna 123. Consequently, during this turnaround period another transmitter can start transmitting on the same transmission channel without LTE-U noticing it. In this case a collision occurs.

The received signal can be stored and evaluated after the power amplifier was turned on in order to combat this problem. Therefore, in a second mode the Clear-Channel Assessment Energy Detection is done by detecting the average power during a CCA-window denoted SPAon by an energy measurement unit 109. The second mode is used once the decision to turn the transmitting path on has been taken. The energy measurement unit 109 is adapted to measure the received power on the transmission channel in a time window, e.g. on the basis of an average power or a peak power within the time window. If the delay period is long several CCA-windows are incorporated in this period. In this case they are measured on in succession until one is found to give a positive detection, at which time the transmitting path 111 is turned off.

The actual energy detection may be implemented in VHDL-code in an FPGA. Detection can also performed within several time windows in succession. As short windows as possible with respect to minimizing the risk of false positive detections, but the shorter the faster a true positive is detected. If it then requires several windows in succession to fill out the entire delay period then that is utilized.

When detecting the average power the CCA-window can be viewed as non-occupied, although in a part of the CCA-window energy is detected. The uncertainty of not knowing whether the sensing period SPAon is judged as free or busy, when half of its time energy is detected, creates a jitter that causes different scenarios to occur. A shorter sensing period SPAon after the decision to turn on the power amplifier decreases interfering time of the signals.

Although the above description exemplifies a scenario with downlink in focus, the invention is equally applicable to uplink transmissions and to any transmission channel, like a channel within an unlicensed band such as a Wi-Fi channel, an LTE-U channel or an LAA-LTE channel or a channel within a licensed band such as an LTE channel, an UMTS channel or a GSM channel. All units or elements of the communication device 100 can be implemented by a digital electrical circuit, like an application-specific integrated circuit (ASIC) or a computer program.

Figure 2:
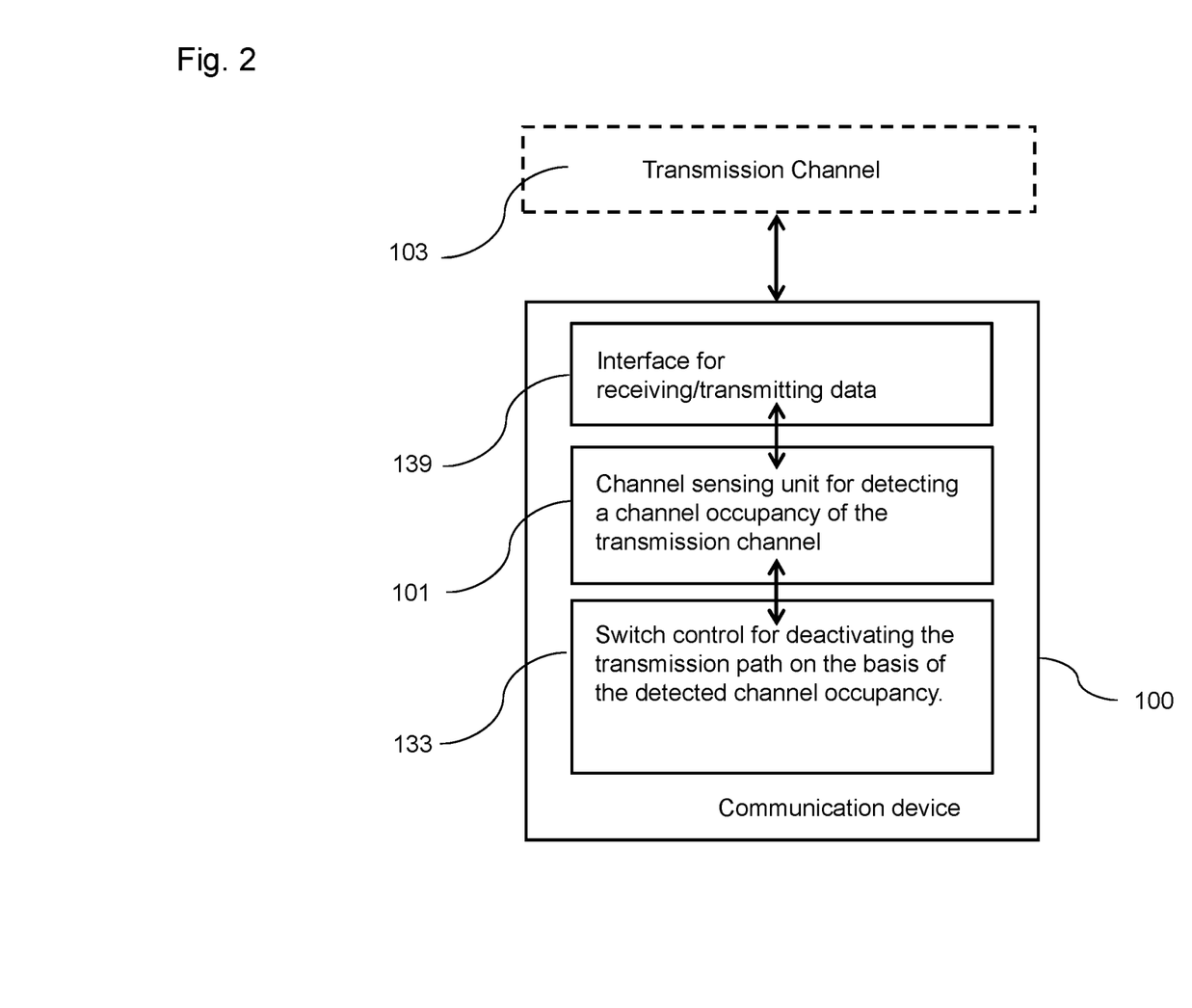
FIG. 2 shows a basic configuration of the communication device for transmitting signals on a transmission channel.

FIG. 2 shows a basic configuration of the communication device 100. The channel sensing unit 101 serves for sensing the channel occupancy of the transmission channel 103 during the turnaround period after the time of the transmitting decision as well for sensing before the time of the transmitting decision. The transmitter 125 serves for sending signals on the transmission channel 103 on the basis of the detected channel occupancy during the turnaround period.

The transmission channel 103 is a physical transmission medium such as a wire or a logical connection over a multiplexed medium such as a radio channel. The transmission channel 103 is used to convey an information signal, for example a digital bit stream, from one or several senders (or transmitters) to one or several receivers. The transmission channel 103 has a certain capacity for transmitting information, e.g. given its data rate in bits per second.

The channel sensing unit 101 of the communication device 100 not only detects a channel occupancy of the transmission channel 103 before the decision to switch from a receiving mode to a transmitting mode is met, but also during the subsequent turnaround period after this decision. In the subsequent turnaround period the non-processed data that are already collected and existent in the Rx-filters before turning on the power amplifier can be additionally used to determine if there is a collision on the transmission channel 103.

The channel sensing unit 101 is able to detect the channel occupancy of the transmission channel 103 in a predetermined time window and evaluate the received power on the basis of an average power or a peak power within the time window. Further, the channel sensing unit 101 can modify or adjust a length or duration of the time window or time windows that follow in sequence without gap in time and always fill out the entire turnaround period. Adjusting of the time window can be performed on the basis of the characteristics of the transmission channel 103, like counting the frequency or intensity of occurrence of transmitters, the durations of the transmit occurrences, the detected energy of transmitters, etc. To this end an algorithm or unit is provided for evaluating the characteristics of the transmission channel 103.

The switch control 133 serves for deactivating or activating the transmission path on the basis of the detected channel occupancy in case the channel sensing unit 101 detects channel occupancy of the transmission channel 103. The communication device 100 comprises an interface 139 for receiving data and/or for transmitting data on the transmission channel 103.

The channel sensing unit 101, the switch control 133 and the interface 139 and all other units can be implemented by a digital electrical circuit, like an application-specific integrated circuit (ASIC) or a computer program.

Figure 3:
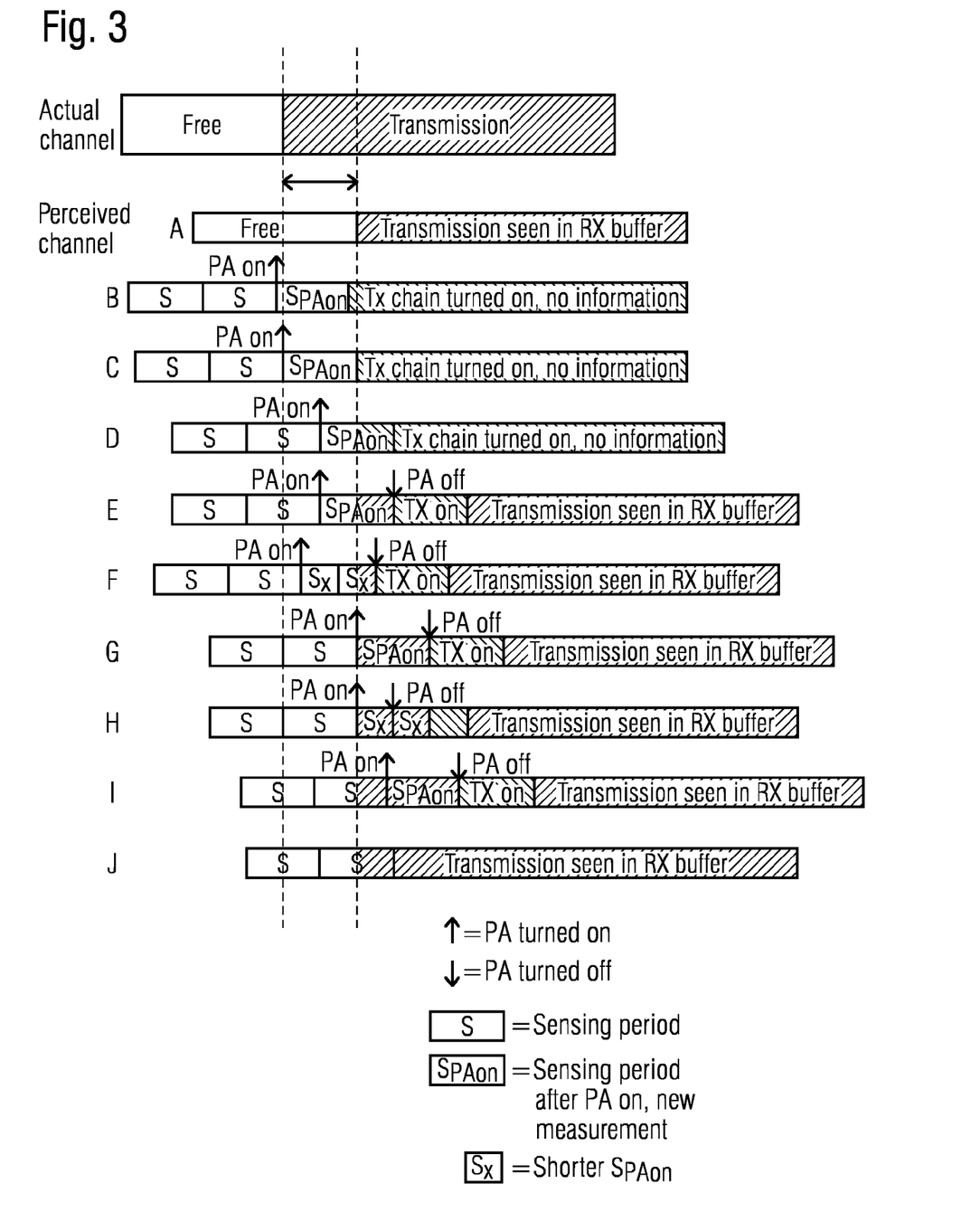
FIG. 3 shows different timing scenarios that can occur due to a turnaround period.

FIG. 3 shows how an actual channel changes from being non-occupied to being occupied by another transmitter that starts a transmission and how different modes work.

When the turnaround period has passed, from the moment the transmitting decision is made the power amplifier is turned on until the last received sample has reached the energy measurement unit 109, the Rx-buffer is still filled with unprocessed data from the receiving path 105. In the sensing period SPAon it is possible to further process these data that are collected in the Rx-filters after the power amplifier is turned on. This could also be a succession of SPAon periods if the turnaround time is long.

During the sensing period S it is sensed if the transmission channel is free and the power amplifier can be turned on. During the sensing period SPAon it is sensed if the transmission channel is busy and the power amplifier can be turned off to shorten the collision time.

The actual transmission channel 103 can be perceived in different ways when a turnaround period is present.

A. The channel sensing unit 101 listens to the transmission channel 103. The Rx-buffer is filled with samples that indicate that the transmission channel 103 is free during the turnaround period but becomes busy right at the end of the turnaround period. Hence, there is a delay of what is seen in the Rx-buffer and what occurs on the channel that equals the turnaround period.

B. The channel sensing unit 101 senses that the transmission channel 103 is free during period S and starts transmitting before the transmission of the other transmitter starts. The transmission of the communication device 100 continues. The other transmitter that starts too late, e.g. due to issues with the sensing having a turnaround delay, and causes the collision.

C. The transmitter 125 of the communication device 100 starts transmitting at the same time as the transmission of the other transmitter starts. The transmission of the communication device 100 continues. The collision happens because the two transmitters start simultaneously.

D. The transmitter 125 starts transmitting after the transmission of the other transmitter has started. However, the energy detected in sensing period SPAon is too short so that the transmission channel 103 is sensed as free and the transmission of the communication device 100 continues. Even though the transmission is started in period S the point where the transmission channel is seen as free or busy changes. The average energy is at the threshold and varies depending on time, distance and output energy of the other transmitter.

E. The transmitter 125 starts transmitting after the transmission of the other transmitter has started. Due to the energy detected in sensing period SPAon the transmission channel 103 is sensed as busy and the transmission of the communication device 100 is stopped. Even though the transmission is started in period S the point where the transmission channel is seen as free or busy changes. The average energy is at the threshold and varies depending on time, distance and output energy of the other transmitter.

F. The transmitter 125 starts transmitting earlier than in case D or E. Since the sensing period Sx after the transmission has started is smaller than or half of the usual sensing period SPAon, the transmission channel 103 is detected due to the small amount of energy as a busy. It is beneficial to have shorter sensing periods that are still long enough that the energy detection can be averaged and compared to a threshold with reasonable reliability of the result.

G. The transmitter 125 starts transmitting at the end of the turnaround period. After the transmission channel 103 during the sensing period SPAon is sensed as busy, the transmission of the communication device 100 is stopped.

H. Case H is the same as case G but with a shorter sensing period Sx which shortens the time during which the power amplifier is turned on. The transmission of the communication device 100 is stopped earlier.

I. In case I the transmission of the other transmitter starts in the second half of sensing period S and the transmission of the communication device 100 is stopped after SPAon. Even though the transmission is started in period S the point where the transmission channel is seen as free or busy changes. The average energy is at the threshold and varies depending on time, distance and output energy of the other transmitter.

J. In case J the transmission of the other transmitter starts before the middle of sensing period S and the transmission channel 103 is sensed as busy so that the transmission of the communication device 100 is not started. Even though the transmission is started in period S the point where the transmission channel is seen as free or busy changes. The average energy is at the threshold and varies depending on time, distance and output energy of the other transmitter.

In cases E-I the sensing done during the sensing period SPAon after the power amplifier is turned on, helps to minimize the duration of a collision on the transmission channel 103. The use of multiple sensing periods having shorter duration, as shown in H, shortens the duration of a collision.

In cases D-I, it's the LAA/LTE-U system that causes the collisions. The invention mitigates the effects by making the collision duration as short as possible. Even other transmitters may have this problem with a delay in the sensing so the invention could be used by any technology.

Figures 4, 4A:
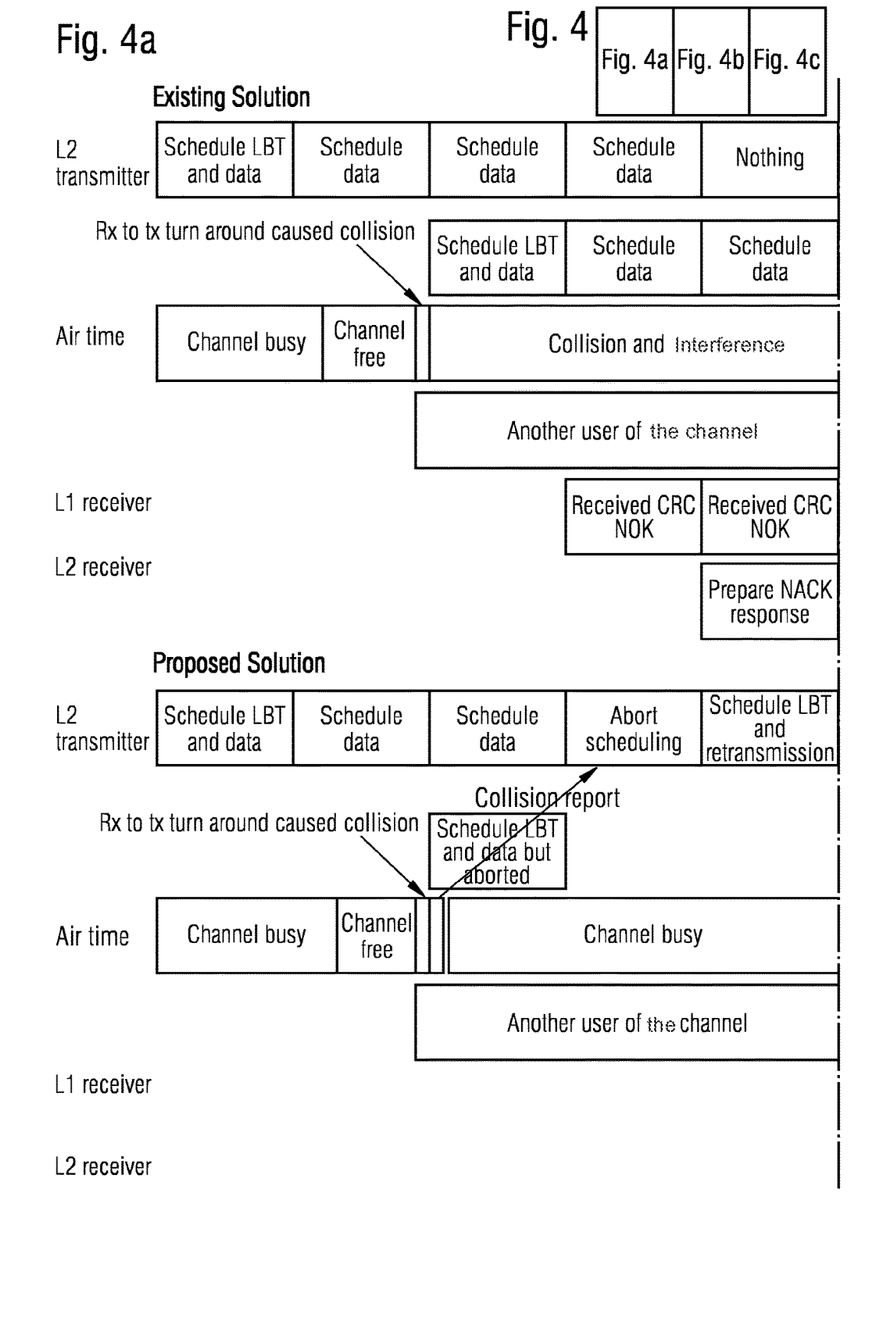
FIG. 4 shows timing relations between different layers and actual air-time.
Figure 4B:
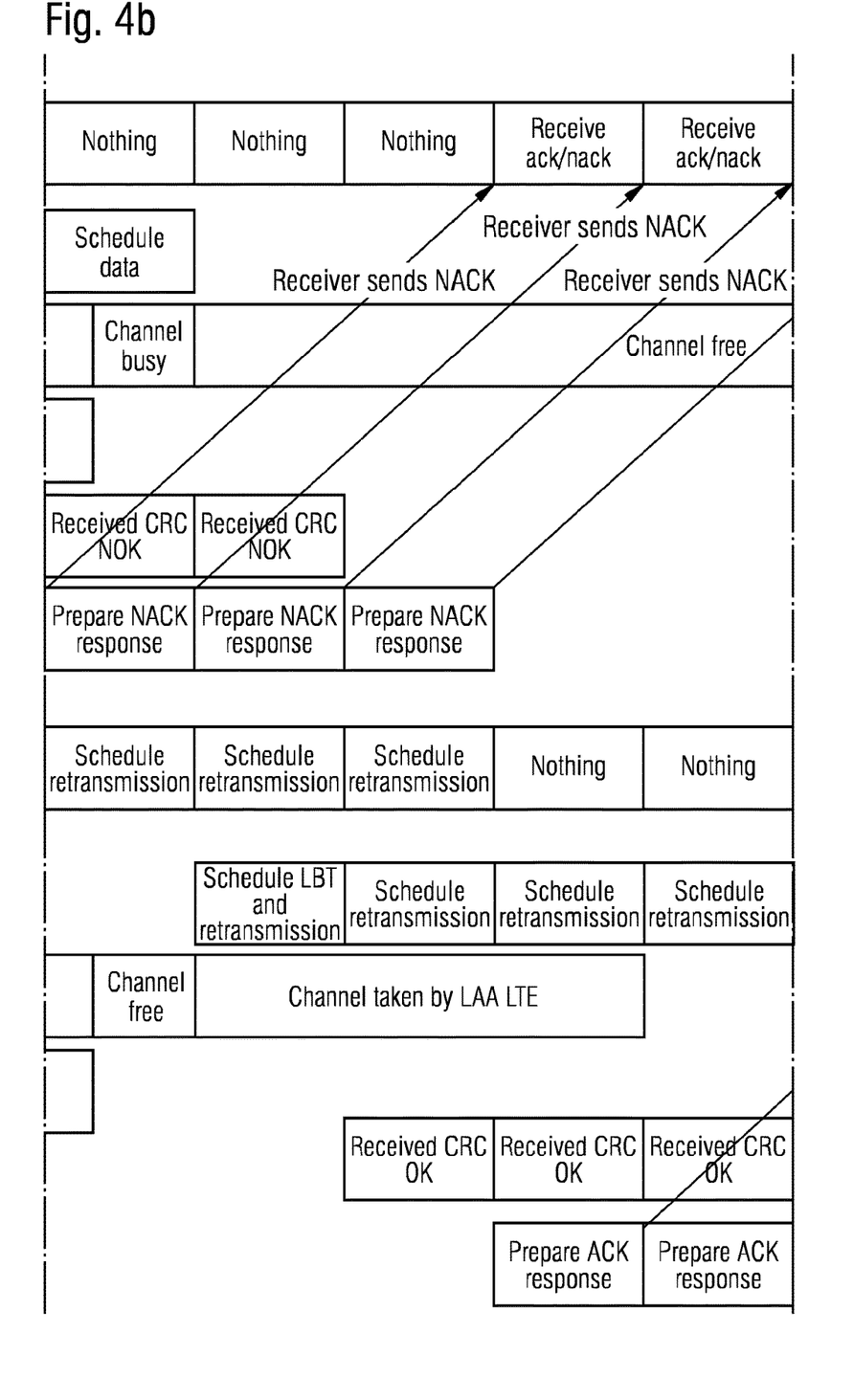
Figure 4C:
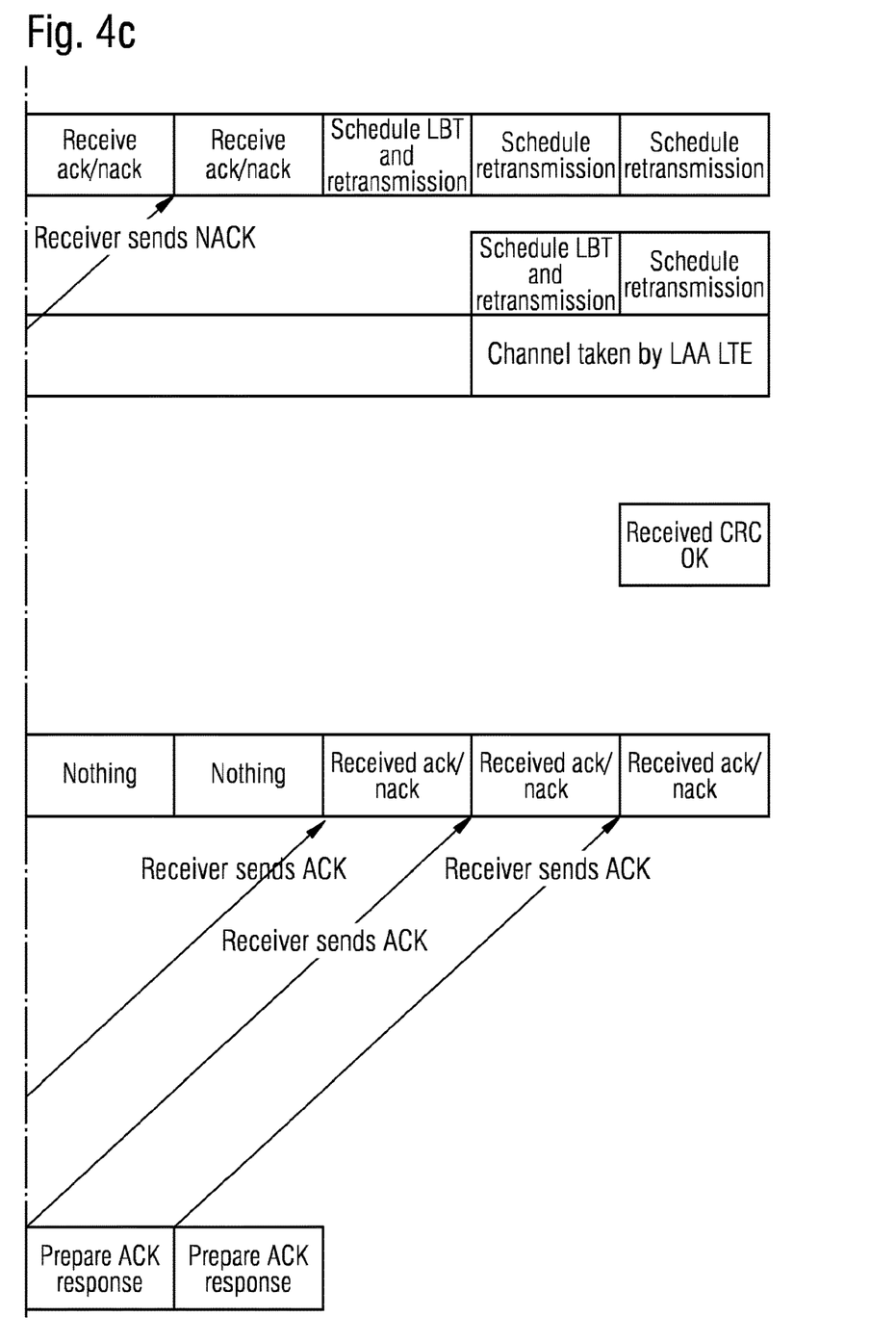

FIG. 4 shows the difference between an existing communication device (existing solution) and the new communication device 100 (proposed solution). The boxes on the "L2 transmitter"-row symbolize scheduling tasks in layer L2 during an LTE subframe. "Air time" symbolizes what actually occurs in the air at the channel frequency.

When the existing communication device is struck by a collision caused by the turnaround period the L1-receiver is likely to produce a "CRC NOK" for the PDSCH, since it is plausible that ePDCCH or PDCCH is decoded but not the PDSCH due to its weaker channel coding compared to the control channel. The L2-receiver has to send a NACK-message to the L2-transmitter and the L2-transmitter starts over. It is also probable that the other transmitter will have problems in decoding its data, thus requiring a retransmission of the data.

If this is an UL-scenario, then the eNB already knows to expect an UL-transmission, since it scheduled it in the first place and it may not be able to decode it (CRC NOK on UL). The reason being that the collision killed the (e)PDCCH message that scheduled the UL or killed the UL transmission itself and the end result is the same.

In the communication device 100 collisions during the turnaround period are detected and the power amplifier is turned off at the same time when the L2 transmitter is notified that the collision occurred. Knowing that there was a collision and that another transmitter is using the transmission channel the L2-transmitter starts preparing the retransmission of the previous data, thus reducing the latency compared to the existing communication device.

The other transmitter of the transmission channel is disturbed by the LTE-U or LAA interference during a shorter time compared to if the invention was not implemented and has a higher chance to decode its data. Hence the need for retransmissions is reduced. Consequently, the effects of the turnaround period are mitigated when a collision in the used transmission channel is detected.

By preventing transmission when the LBT-mechanism has detected a collision during the turnaround period, collision lengths are reduced and other transmitters of the transmission channel are affected less. Other transmitters can receive and decode their transmission instead of losing both transmissions.

Furthermore, latency and collision handling is improved, since the communication device 100 immediately realizes that a collision has occurred. Layer 2 can deal with the collision directly after it is signaled from the communication device 100 to Layer 2. This is in comparison faster than being informed about an actual collision after the receiving side, i.e. the eNB/user equipment, has sent a negative acknowledgement after a number of subframes.

This also increases the efficiency of the transmission channel 103, since layer 2 at the transmitting side can use the time that the receiver would use to send its negative acknowledgement to actually send an un-interfered version of the earlier message when the transmission channel 103 is free.

Figure 5:
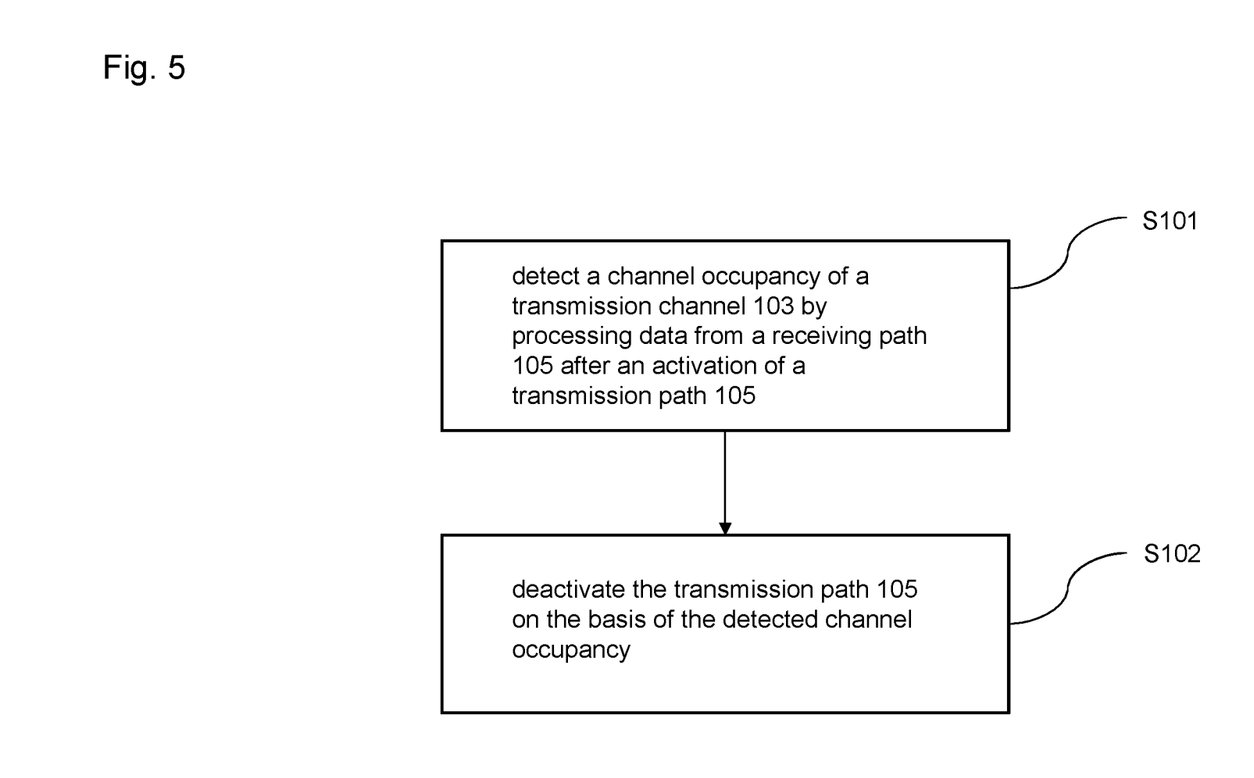
FIG. 5 shows a block diagram of a method for transmitting signals on a transmission channel.

FIG. 5 shows a block diagram of a method for transmitting signals on a transmission channel 103. The method comprises the step S101 of detecting the channel occupancy of a transmission channel by processing data from a receiving path after an activation of a transmission path and the step S102 of deactivating the activated transmission path 111 on the basis of the detected channel occupancy. The method can be performed on the communication device 100 for transmitting signals on a transmission channel 103.

Figure 6:
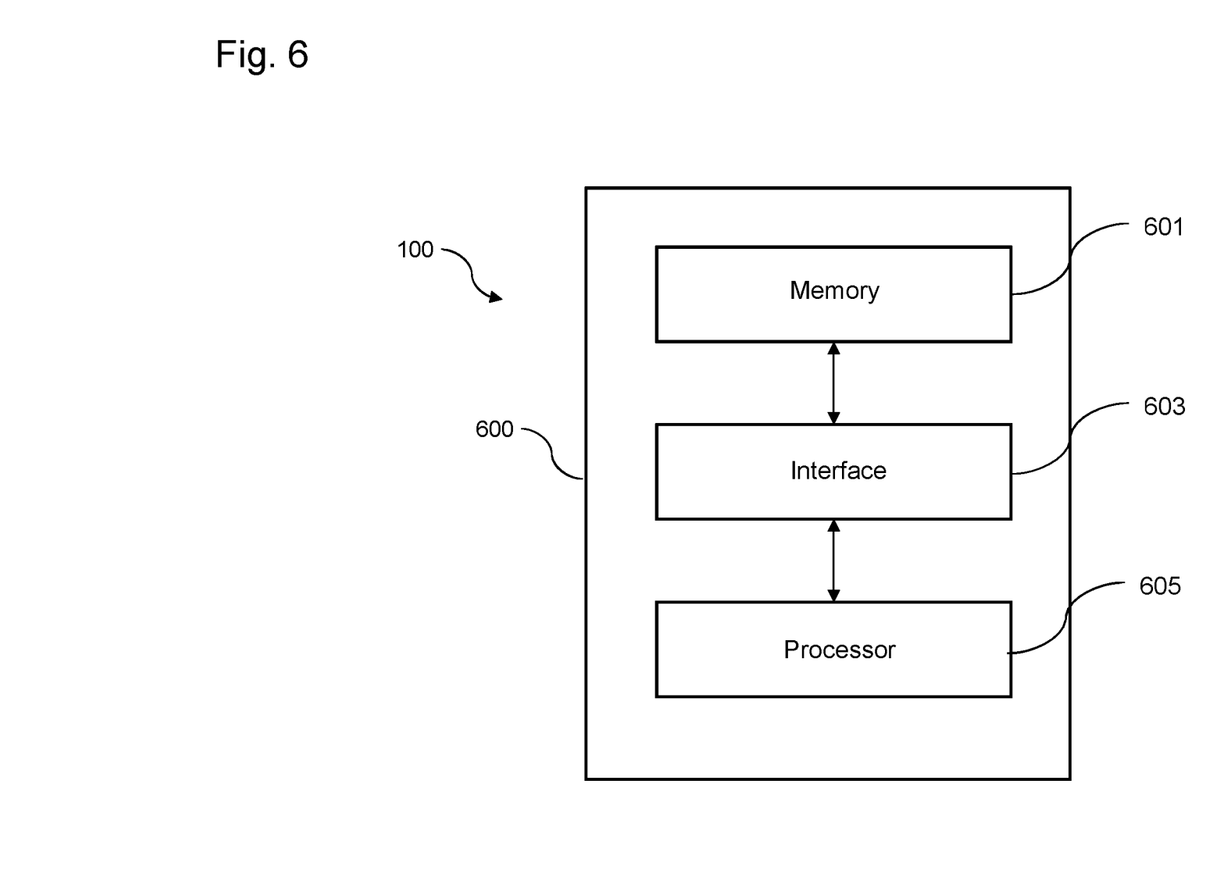
FIG. 6 shows a communication device comprising a processor and storage.

FIG. 6 shows a digital computer 600 for incorporation in the communication device 100. The communication device 100 can comprise a computer program product that is loadable into the internal memory 601 of the communication device 100, comprising software code portions for performing any of the aforementioned method steps when said product is run on the communication device 100.

The computer 600 can be implemented by hardware or firmware right at the receiving antenna 123 and can be programmed to carry out a set of arithmetic or logical operations automatically on the basis of software code portions. The computer 600 comprises the internal memory 601, such like a random-access memory chip that is coupled by an interface 603, like an IO bus, with a processor 605. The processor 605 is the electronic circuitry within the computer 600 that carries out the instructions of the software code portions by performing the basic arithmetic, logical, control and input/output (I/O) operations specified by the instructions. To this end the processor 605 accesses the software code portions that are stored in the internal memory 601.

During the sensing period SPAon it is possible by the communication device 100 to process data that are collected in the Rx-filters after the power amplifier is turned on.

Only in the case when a collision is detected during the sensing period SPAon, action is taken and the power amplifier is turned off as soon as possible. Turning off the power amplifier leads to an improved latency, collision-handling and channel usage of the transmission channel 103.

In contrast, existing communication devices make a decision only during a sensing period and transmit data on the transmission channel without considering the subsequent turnaround period.

If the measurements taken during the turnaround period are evaluated after the power amplifier is turned on and it is indicated that another transmitter on the transmission channel 103 has already started a transmission, the power amplifier is immediately turned off. When the power amplifier is turned off, the interference is reduced from the planned occupancy time to the length of about one SPAon-window.

Interference is then reduced from milliseconds to microseconds. This is a significant improvement for the other transmitter and greatly enhances the probability that its transmission is decodable at the intended receiver.

The invention disclosed herein is equally applicable to the case when LTE is used as a "secondary carrier" in the unlicensed spectrum but with a primary carrier in a licensed band. This is normally referred to as License-Assisted Access via LTE or LAA-LTE.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

ABBREVIATION EXPLANATION

3GPP Third-Generation Partnership Program
CCA Clear-Channel Assessment
CCA-ED Clear-Channel Assessment Energy Detection
CRC Cyclic Redundancy Check
eNB LTE base station
ePDCCH extended Physical Downlink Control Channel
FGPA field-programmable gate array
L1 Layer 1
L2 Layer 2
LAA-LTE License-Assisted Access via LTE
LTE-U LTE in unlicensed spectrum
LBT Listen-Before-Talk
LTE Long-Term Evolution
MCS Modulation and Coding Scheme
NOK Not OK
PA Power Amplifier
PDCCH Physical Downlink Control Channel
PDSCH Physical Downlink Shared Channel
Rx Receive side
Tx Transmit side
UE User Equipment

The invention claimed is:

1. A method for transmitting signals on a transmission channel, comprising:
    detecting a channel occupancy of a transmission channel by processing data from a receiving path after an activation of a transmission path, wherein the channel occupancy is detected based on the received power on the transmission channel in a sequence of time windows, and wherein the received power is evaluated on an average power or a peak power within the sequence of time windows; and
    deactivating the transmission path based on the detected channel occupancy.

2. The method of claim 1, wherein the length of the time window is shorter than a delay in the receiving path.

3. The method of claim 1, wherein the time window is adjustable.

4. The method of claim 3, wherein a length of the time window is adjusted based on the characteristics of the transmission channel.

5. The method of claim 1, wherein the activation of a transmission path comprises an activation of a power amplifier in the transmission path.

6. The method of claim 1, wherein the deactivation of a transmission path comprises a deactivation of a power amplifier in the transmission path.

7. The method of claim 1, wherein the transmission channel comprises:
   a channel within an unlicensed band comprising a Wi-Fi channel, a Long-Term Evolution (LTE) channel in an unlicensed spectrum, or an License-Assisted Access via LTE (LAA-LTE) channel; or
   a channel within a licensed band comprising an LTE channel, an UMTS channel or a GSM channel.

8. The method of claim 1, wherein the data is processed within a predetermined time period after the activation of the transmission path.

9. A communication device for transmitting signals on a transmission channel, comprising:
   processing circuitry;
   memory containing instructions executable by the processing circuitry whereby the communication device is operative to:
      detect a channel occupancy of the transmission channel by processing data from a receiving path after an activation of a transmission path, wherein the channel occupancy is detected based on received power on the transmission channel in a sequence of time windows, and wherein the received power is evaluated on an average power or a peak power within the sequence of time windows; and
      deactivate the transmission path based on the detected channel occupancy.

10. The communication device of claim 9, wherein the length of the time window is shorter than a delay in the receiving path.

11. The communication device of claim 9, wherein the instructions are such that the communication device is operative to adjust the time window.

12. The communication device of claim 11, wherein the instructions are such that the communication device is operative to adjust a length of the time window based on the characteristics of the transmission channel.

13. The communication device of claim 9, wherein the activation of a transmission path comprises an activation of a power amplifier in the transmission path.

14. The communication device of claim 9, wherein the deactivation of a transmission path comprises a deactivation of a power amplifier in the transmission path.

15. The communication device of claim 9, wherein the communication device is a user equipment, a base station, or machine-type communication device.

16. The communication device of claim 9, wherein the instructions are such that the communication device is operative to process the data within a predetermined time period after the activation of the transmission path.

17. A non-transitory computer readable recording medium storing a computer program product for controlling communication device for transmitting signals on a transmission channel, the computer program product comprising software instructions which, when run on processing circuitry of the communication device, causes the communication device to:
   detect a channel occupancy of a transmission channel by processing data from a receiving path after an activation of a transmission path, wherein the channel occupancy is detected based on the received power on the transmission channel in a sequence of time windows, and wherein the received power is evaluated on an average power or a peak power within the sequence of time windows; and
   deactivate the transmission path based on the detected channel occupancy.

* * * * *